No. 743,655. PATENTED NOV. 10, 1903.
J. C. McINTYRE.
MACHINE FOR REMOVING THE SILK FROM GREEN CORN.
APPLICATION FILED FEB. 9, 1903.
NO MODEL. 4 SHEETS—SHEET 1.

Witnesses:
J. M. Snyder, Jr.
E. A. Volk.

John C. McIntyre, Inventor.
By Wilhelm Bonner,
Attorneys.

No. 743,655. PATENTED NOV. 10, 1903.
J. C. McINTYRE.
MACHINE FOR REMOVING THE SILK FROM GREEN CORN.
APPLICATION FILED FEB. 9, 1903.
NO MODEL. 4 SHEETS—SHEET 2.
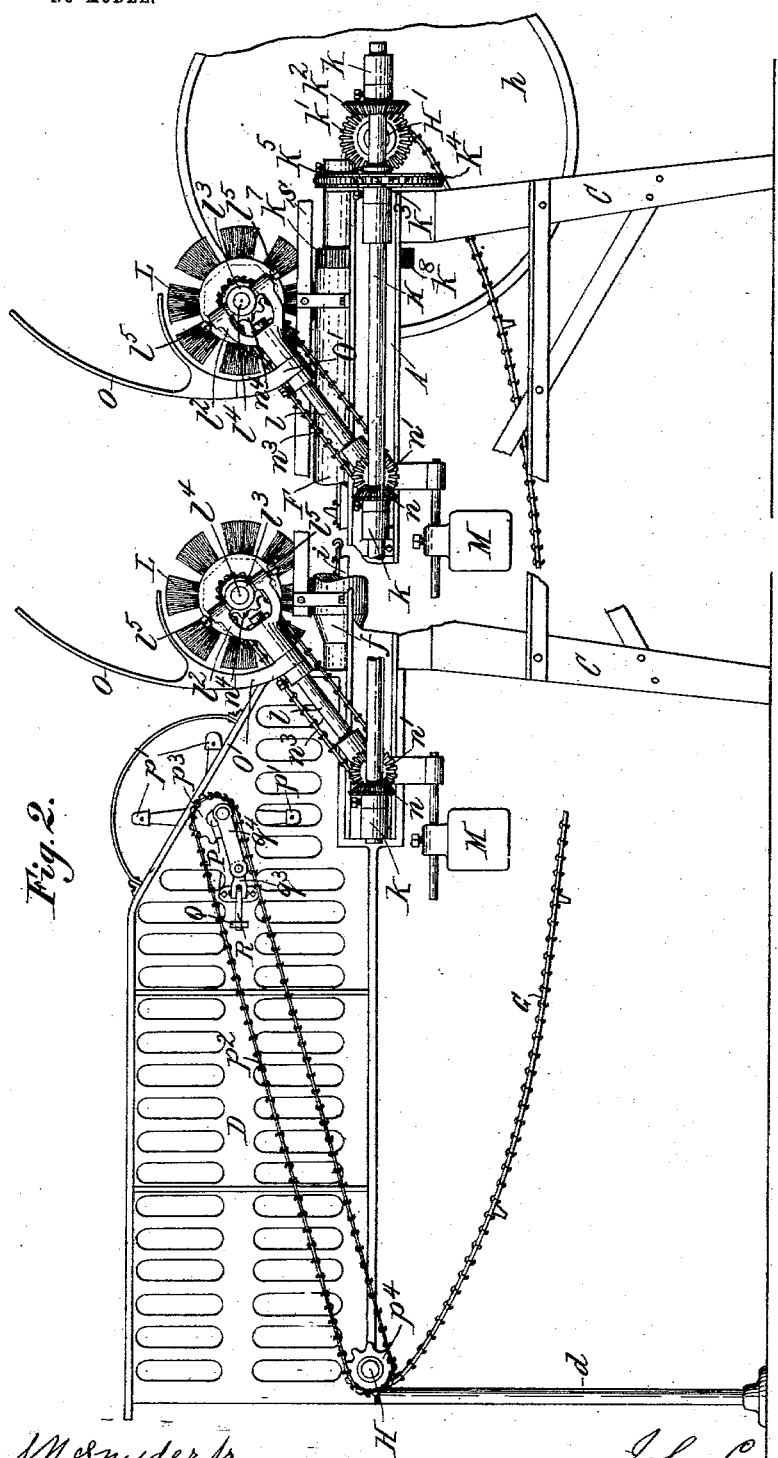
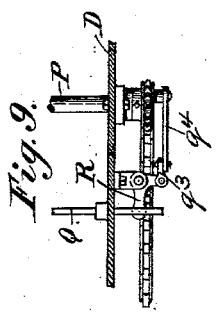

No. 743,655. PATENTED NOV. 10, 1903.
J. C. McINTYRE.
MACHINE FOR REMOVING THE SILK FROM GREEN CORN.
APPLICATION FILED FEB. 9, 1903.
NO MODEL. 4 SHEETS—SHEET 3.

Witnesses:
J. M. Snyder, Jr.
E. A. Volk.

Inventor:
John C. McIntyre
By Wilhelm & Bonner, Attorneys

No. 743,655. PATENTED NOV. 10, 1903.
J. C. McINTYRE.
MACHINE FOR REMOVING THE SILK FROM GREEN CORN.
APPLICATION FILED FEB. 9, 1903.
NO MODEL. 4 SHEETS—SHEET 4.

Witnesses:
J. M. Snyder, Jr.
E. A. Volk.

John C. McIntyre, Inventor
By Wilhelm Bonner
Attorneys.

No. 743,655. Patented November 10, 1903.

UNITED STATES PATENT OFFICE.

JOHN C. McINTYRE, OF HOOPESTON, ILLINOIS, ASSIGNOR TO SPRAGUE CANNING MACHINERY COMPANY, OF CHICAGO, ILLINOIS.

MACHINE FOR REMOVING THE SILK FROM GREEN CORN.

SPECIFICATION forming part of Letters Patent No. 743,655, dated November 10, 1903.

Application filed February 9, 1903. Serial No. 142,522. (No model.)

*To all whom it may concern:*

Be it known that I, JOHN C. MCINTYRE, a citizen of the United States, residing at Hoopeston, in the county of Vermilion and State of Illinois, have invented new and useful Improvements in Machines for Removing Silk from Green Corn, of which the following is a specification.

This invention relates more particularly to that type of machines for removing the silk from ears of green corn before cutting off the kernels in which the husked ears of green corn are supported and turned about their axes on rollers beneath rotary brushes which remove the silk from the ears and propel the latter through the machine by the frictional contact of the brushes with the ears of corn.

The object of the invention is to provide a rapid and efficient machine of large capacity to which the ears of corn can be supplied indiscriminately in large quantities and which will remove the silk from a number of ears simultaneously.

A further object is to produce a machine which will thoroughly and perfectly remove all the silk from the ears without injuring or breaking the kernels of corn.

Figure 1:
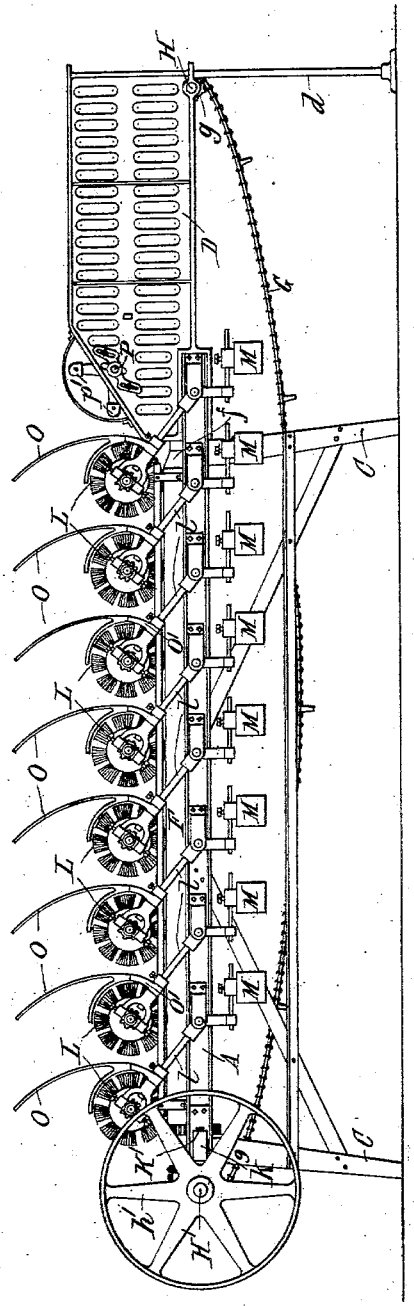
Figure 8:
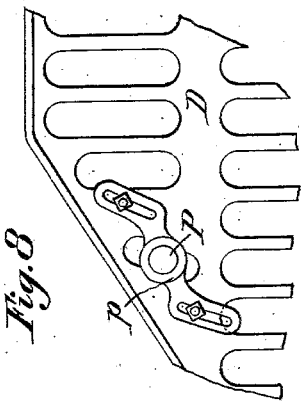
Figure 3:
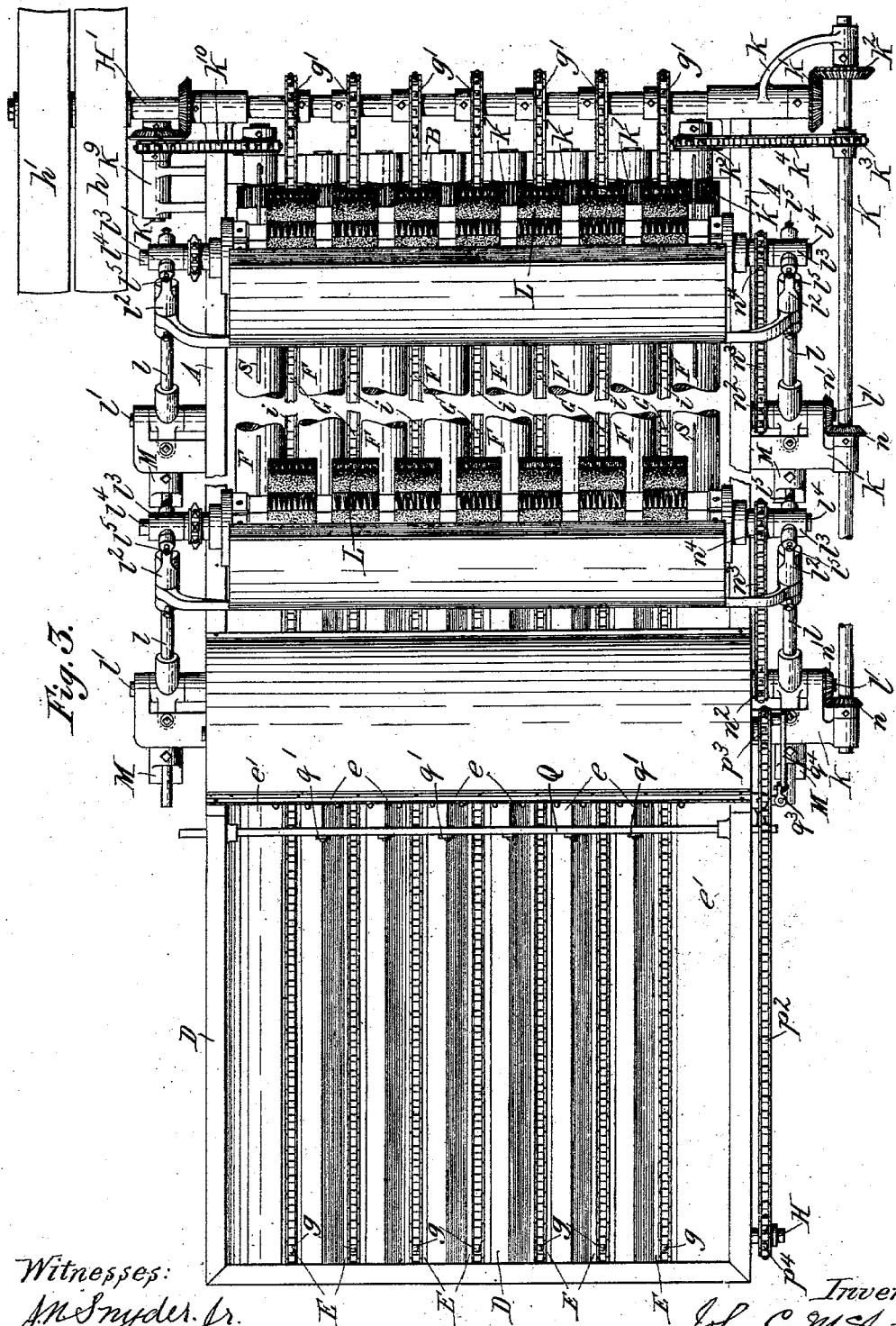
Figure 4:
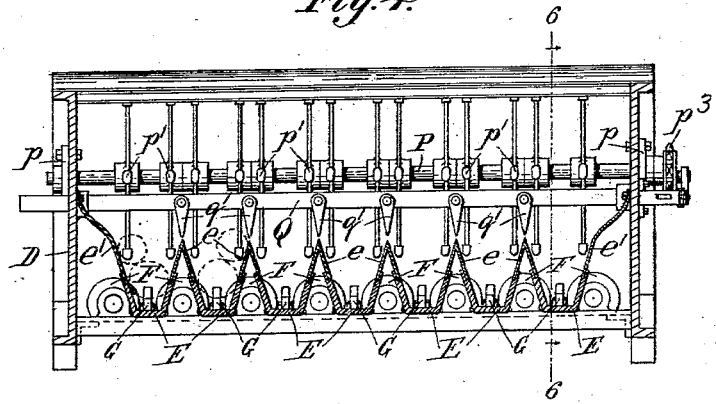
Figure 5:
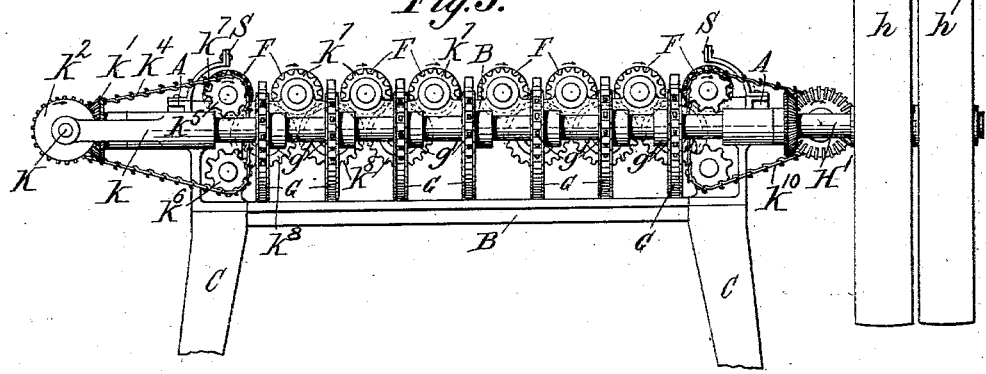
Figure 6:
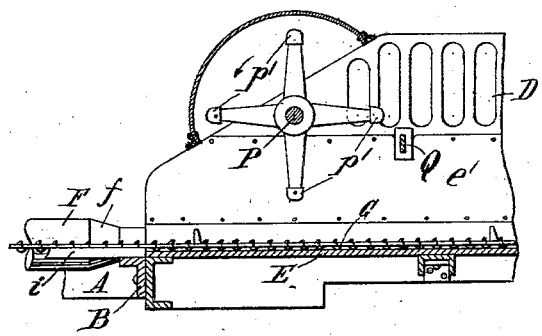
Figure 7:
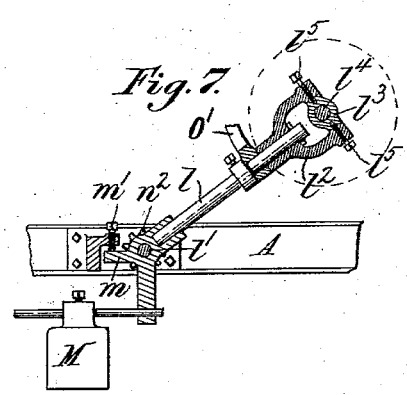

In the accompanying drawings, consisting of four sheets, Figure 1 is a side elevation, on a reduced scale, of a machine embodying the invention. Fig. 2 is a broken side elevation thereof, the view being taken from the side opposite that shown in Fig. 1. Fig. 3 is a broken plan view thereof. Fig. 4 is a transverse sectional elevation through the feed-hopper. Fig. 5 is an elevation of the tail or discharge end of the machine. Fig. 6 is a fragmentary sectional elevation showing the rotary retarding device. Fig. 7 is a sectional elevation showing one of the bearing-arms for the silking-brushes. Fig. 8 is a fragmentary elevation of a portion of the feed-hopper, showing one of the adjustable journals for the shaft of the retarding device. Fig. 9 is a detail plan view of the operating mechanism for the reciprocating separator.

Like letters of reference refer to like parts in the several figures.

The machine shown in the drawings and hereinafter specifically described comprises, briefly stated, a feed hopper or box arranged at the forward end of the machine and provided with a bottom which is divided into a series of longitudinal troughs or channels in which travel conveyers which carry the ears of corn through said channels onto a series of rollers arranged lengthwise of the machine in rear of the hopper. The rollers are all rotated in the same direction and act to support the ears of corn and turn the same about their axis. Above the rollers is arranged a series of transverse rotary brushes which remove the silk from the ears of corn and which are driven in a direction such that they propel or move the ears of corn rearwardly on the supporting-rollers. The ears of corn are discharged from the rear ends of the rollers after passing the several silking-brushes.

The main or supporting frame of the machine may be of any suitable or preferred construction. That shown in the drawings is of substantially rectangular form consisting of longitudinal side rails or bars A, connected by transverse rails or bars B and having upright supporting legs or standards C, which are suitably braced.

D represents the feed-hopper, which is provided with upright front and side walls and is supported at its rear end in any suitable manner on the front end of the main frame, the front end of the feed-hopper being preferably supported by legs $d$. The bottom of the feed-hopper (see Fig. 4) is composed of a series of longitudinal trough-shaped or channel plates or bars E, which are arranged parallel and are supported at their opposite ends on the transverse horizontal bars of the main frame. The channel-bars are connected and the spaces between them covered by substantially inverted-V-shaped plates $e$, and the spaces between the two outside channel-bars and the sides of the feed-hopper are covered by inclined plates $e'$.

F represents a series of rollers which are arranged in a substantially horizontal plane longitudinally of the machine and parallel with each other in rear of the feed-hopper. The rollers are journaled in any suitable manner at their front and rear ends in bearings on the transverse frame-bars. The rollers are arranged in vertical planes between the troughs or channels of the feed-hopper, so that the spaces between the upper portions of adjacent rollers constitute, in effect, continuations of said troughs or channels. The front ends of the rollers F are beveled at $f$, Figs. 2 and 6, so that the ears of corn can pass readily from the troughs or channels into the spaces between the rollers. In the bottoms of the channels or troughs thus formed by the channel-bars and rollers travel endless conveyer chains or belts G, which run on sprocket-wheels $g$ $g'$ secured, respectively, to shafts H H', journaled transversely of the machine at the front and rear ends thereof. The shaft H', which constitutes the main or drive shaft, may be driven in any suitable manner and in the construction shown is provided at one end with tight and loose drive-pulleys $h$ $h'$. The upper runs of the conveyer-chains travel rearwardly in the troughs or channels of the feed-hopper and are supported horizontally or prevented from sagging between the rollers F in any suitable manner—for instance, by channel bars or guides $i$, Fig. 6, which are arranged between the rollers and are supported at their opposite ends on the transverse bars of the main frame. The conveyer chains are provided with projecting teeth or lugs, which on the upper runs of the chains project upwardly into the troughs of the feed-hopper and spaces between the rollers F.

The rollers are all rotated in one direction, so that the ears of corn which are supported on the upper portions of the surfaces of adjacent rollers are turned or rotated axially and there is no tendency for the rollers to grip or pinch the ears and carry the same down between the rollers and crush the corn.

The mechanism shown in drawings Figs. 2, 3, and 5 for driving the supporting-rollers is constructed as follows: K represents a brush-operating shaft, which is arranged longitudinally at one side of the machine and is journaled in bearings in suitable brackets $k$, projecting from the adjacent side rail of the main frame. This shaft is driven from the drive-shaft by intermeshing bevel gear-wheels $k'$ $k^2$, fixed, respectively, to the drive-shaft and longitudinal shaft K. The brush-operating shaft K is provided with a sprocket-wheel $k^3$, which drives a sprocket-chain $k^4$, running thereon and on a sprocket-wheel $k^5$, secured to the rear end of the adjacent outside roller. The sprocket-chain also passes over an idle sprocket-wheel $k^6$, which is journaled on the main frame below the end of the outside roller. This wheel is for the purpose of guiding the sprocket-chain around the bearing-bracket or side bar of the frame. The outside roller is thus rotated, and the adjacent half of the rollers are driven in the same direction from the outside roller by gear-wheels $k^7$, secured to the rear ends of the rollers and meshing with idle gear-wheels $k^8$, journaled on the rear end of the main frame between the gear-wheels on the rollers. K' represents a short shaft which is arranged longitudinally at the opposite side of the machine in a bearing-bracket $k^9$, projecting from the main frame. This shaft is driven from the drive-shaft by intermeshing gear-wheels and drives the adjacent outside roller through the medium of a sprocket-chain $k^{10}$ and sprocket-wheels arranged similarly to the corresponding parts for the other outside roller. The remaining rollers are driven in the same direction as the other rollers from the last-mentioned outside roller by intermeshing gear-wheels on the rollers and idle gear-wheels journaled on the main frame, as in the case of the other half of the rollers. This drive mechanism is deemed desirable, as the strain is divided between the shafts at opposite sides of the machine and there is less lost motion. Any other suitable drive mechanism for the rollers, however, may be employed.

L represents brushes for removing the silk from the ears of corn. There are a number of these brushes, which are arranged transversely of the machine above and out of contact with the supporting and turning rollers for the ears of corn. The brushes may be constructed in any suitable manner and of any material which will properly remove the silk from the corn without marring or harming the kernels. The brushes are preferably journaled in the following manner: $l$ represents swinging bearing-arms for the opposite ends of the brushes. The bearing-arms are mounted to swing vertically on short transverse horizontal shafts $l'$, supported in suitable bearing-brackets at opposite sides of the main frame, the short shafts $l'$ at the side of the machine adjacent to the brush-operating shaft K being journaled to rotate in bearings on the brackets $k$ for the brush-operating shaft. The bearing-arms are provided at their upper ends with swiveled yokes $l^2$, in which are pivoted bearing-blocks $l^3$ for the journals $i^4$, which project from opposite ends of the brushes. The bearing-blocks for the brush-journals are swiveled in the yokes on screws or pins $l^5$, arranged transversely or at right angles to the axis of the bearing-arms, so that each brush is journaled in universally-movable bearings on the swinging bearing-arms and is free to accommodate itself to the different sizes of the ears of corn on the rollers beneath the brush without cramping or binding the brush-journals in their bearings. Thus if a large ear of corn is beneath the brush at one end and smaller ears at the other end the brush can tilt, so that it bears with substantially the same pressure on all of the ears of corn. Each of the bearing-arms for the silking-brushes is provided at its lower end with a counterbalancing-weight M, which is adjustably mounted on a rod projecting from the lower end of the bearing-arm. The bearing-arm is also provided with a lug $m$, Fig. 7, which projects beneath a stop-screw $m'$, screwed into an overhanging portion of the bearing-bracket for the shaft $l'$.

By adjusting the weight toward or from the pivot of the bearing-arm the pressure of the brush on the ears of corn can be nicely regulated, and the stop-screw affords an adjustable device for limiting the downward movement of the brush. The shafts $l'$ at the side of the machine at which the brush-operating shaft K is located are driven from said shaft K by intermeshing bevel gear-wheels $n$ $n'$ on the brush-operating shaft and the short shafts $l'$. The latter are provided with sprocket-wheels $n^2$, which are connected by sprocket-chains $n^3$ with sprocket-wheels $n^4$ on the brush-journals at the adjacent ends of the brushes. Both journals of each silking-brush are preferably provided with sprocket-wheels, so that if a brush wears unevenly it can be reversed end for end in its bearings and be driven from the brush-operating shaft.

O represents troughs or shields for catching the silk which is removed from the ears of corn by the silking-brushes. One of these shields is arranged above each of the silking-brushes and is supported at its opposite ends by legs O', which are loosely connected to the upper ends of the bearing-arms of the brushes. The shields thus move with the brushes in their adjustment and in their movements to accommodate themselves to the ears of corn. Each of the shields is provided with a rearwardly-projecting curved bottom, which is substantially concentric with the brush and is spaced slightly from the periphery of the latter, so that in the rotation of the brush the silk which is carried up with the brush is thrown by centrifugal force over the bottom of the shield into the same.

As the ears of corn are placed in the feed-hopper in large quantities or in bulk, it is necessary to prevent a plurality of ears of corn from being carried by each conveyer-chain to the silking-brushes. For this purpose a rotary retarding device is provided, comprising a transverse horizontal shaft P, which is journaled in the rear end of the hopper in suitable adjustable bearings $p$ at the sides of the latter and is provided with a number of spiders or arms projecting radially from the shaft. These arms in the rotation of the shaft extend down into the troughs or channels of the feed-hopper sufficiently far to strike ears of corn which may be supported by an ear or ears in the bottom of the troughs or channel. The shaft is driven so that the arms move forwardly on the lower side of the shaft and tend to strike and kick or hold the superposed ears of corn back while the lowermost ears in the bottoms of the channels are carried forward to the brushes by the conveyer-chains. The arms or spiders are preferably provided at their ends with covers or shields $p'$, of soft or yielding material, which prevent the arms from marring or breaking the kernels of corn. The retarder-shaft is driven in any suitable manner—for instance, by means of a sprocket-chain $p^2$, which runs on sprocket-wheels $p^3$ and $p^4$, secured, respectively, to the shaft of the retarding device and the shaft at the front end of the machine for the conveyer-chains. Besides the retarding device just described a transversely-reciprocating device is provided for aiding in preventing the ears of corn from piling in the troughs and also for turning the ears of corn into a position longitudinally with respect to the machine, so that they can enter the longitudinal troughs of the feed-hopper. This device consists of a transverse horizontal rod Q, which is mounted to slide in bearings on the sides of the hopper and is provided with a series of depending fingers $q'$, the lower ends of which are slightly above the upper edges of the bars or plates covering the spaces between the troughs or channels of the feed-hopper. The bar is reciprocated transversely of the machine, and its fingers strike the ears of corn which are above the tops of the cover-plates between the troughs and turn or move the ears, so that they can drop into the troughs. The bar Q is reciprocated by any suitable means. The mechanism shown in the drawings, Figs. 2 and 9, for this purpose consists of a bell-crank lever R, which is pivoted on the side of the feed-hopper and is connected to the adjacent end of the reciprocating separator-bar. The other end of the bell-crank lever is connected by links $q^3$ $q^4$ with a crank-pin on a wheel secured to the rotary shaft of the retarding device.

S, Figs. 2 and 5, represents longitudinal guard strips or rails which are supported adjacent to and above the outside supporting-rollers and serve to prevent the corn from falling off of the outside rollers.

The operation of the machine is as follows: The shucked ears of green corn are placed in the feed-hopper in quantity or in bulk without regard to the relative arrangement of the ears, and the lowermost ears drop into the troughs or channels of the feed-hopper. The ears which extend crosswise of the troughs or channels are turned or worked around to a position lengthwise of the channels by the reciprocating device Q and the rotary retarding device. The teeth on the conveyer-chains engage the ears which fall into the troughs and carry the same rearwardly onto the supporting-rollers. The ears which rest on the lowermost ears in the troughs are held or knocked back by the rotary retarding device P, and only the lowermost ears pass to the rollers. The supporting-rollers turn the ears of corn about their axes to present all portions of the ears to the silking-brushes, which remove the silk thoroughly from the ears. The teeth on the feed-chains are spaced quite far apart to lessen the liability of marring the corn and are not relied upon to convey the normal-sized ears over the rollers, the rearward movement of the ears being accomplished by the rotating silking-brushes. The ears which are too small in diameter for the brushes to exert sufficient pressure thereon to propel them rearwardly over the rollers are carried along by the conveyer-teeth. The ears after the silk has been removed therefrom fall off the tail end of the rollers, and a suitable receptacle may be provided, if desired, to receive the ears.

I claim as my invention—

1. The combination of a feed-hopper, the lower portion of which is divided into a plurality of longitudinal channels, rollers arranged longitudinally in rear of the spaces between said channels, means for operating said rollers to turn the ears of corn, conveyers which travel in said channels for conveying the ears of corn to said rollers, a silking-brush arranged transversely over said rollers, means for operating said brush, and a device arranged in advance of said brush for preventing superposed ears of corn from being conveyed to said brush by said conveyers, substantially as set forth.

2. The combination of a feed-hopper, the lower portion of which is divided into a plurality of longitudinal channels, rotary rollers arranged longitudinally in rear of the spaces between said channels, conveyers which travel in said channels for conveying the corn to said rollers, silking-brushes arranged transversely over said rollers, means for operating said brushes, and a device arranged in advance of said brushes for preventing superposed ears of corn from being carried to the brushes by said conveyers, substantially as set forth.

3. The combination of a feed-hopper, the lower portion of which is divided into a plurality of longitudinal channels, rotary rollers arranged longitudinally in rear of the spaces between said channels, conveyers which travel in said channels for conveying the corn to said rollers, silking-brushes arranged transversely over said rollers, means for operating said brushes, and a rotary device arranged in advance of said brushes for preventing superposed ears of corn from being carried to the brushes by said conveyers, substantially as set forth.

4. The combination of a feed-hopper, the lower portion of which is divided into a plurality of longitudinal channels, rotary rollers arranged longitudinally in rear of the spaces between said channels, conveyers which travel in said channels for conveying the corn to said rollers, silking-brushes arranged transversely over said rollers, means for operating said brushes, and a rotary shaft extending across said feed-hopper in advance of said brushes and provided with radial arms which are adapted to extend into the upper portions of said channels, substantially as set forth.

5. The combination of a feed-hopper, the lower portion of which is divided into a plurality of longitudinal channels, rotary rollers arranged longitudinally in rear of the spaces between said channels, conveyers which travel in said channels for conveying the corn to said rollers, silking-brushes arranged transversely over said rollers, means for operating said brushes, and a rotary shaft extending across said feed-hopper in advance of said brushes and provided with radial arms which are adapted to extend into the upper portions of said channels near the side walls thereof, substantially as set forth.

6. The combination of a feed-hopper, the lower portion of which is divided into a plurality of longitudinal channels, rotary rollers arranged longitudinally in rear of the spaces between said channels, conveyers which travel in said channels for conveying the corn to said rollers, silking-brushes arranged transversely over said rollers, means for operating said brushes, and a reciprocating device arranged in said hopper for moving the ears of corn into said channels, substantially as set forth.

7. The combination of a feed-hopper, the lower portion of which is divided into a plurality of longitudinal channels, rotary rollers arranged longitudinally in rear of the spaces between said channels, conveyers which travel in said channels for conveying the corn to said rollers, silking-brushes arranged transversely over said rollers, means for operating said brushes, a rod arranged transversely in said hopper and provided with depending fingers terminating above said channels, and means for reciprocating said rod transversely, substantially as set forth.

8. The combination of a feed-hopper, the lower portion of which is divided into a plurality of longitudinal channels, rotary rollers arranged longitudinally in rear of the spaces between said channels, conveyers which travel in said channels for conveying the corn to said rollers, silking-brushes arranged transversely over said rollers, means for operating said brushes, a transversely-reciprocating device in said hopper for moving the ears into said channels, and a rotary device for preventing superposed ears of corn from being carried to the brushes by said conveyers, substantially as set forth.

9. The combination of substantially horizontal rollers for supporting and revolving the ears of corn, a rotary silking-brush arranged transversely above said rollers and provided at its opposite ends with journals, and universally-movable bearings in which said journals are mounted, substantially as set forth.

10. The combination of substantially horizontal rotary rollers for supporting and revolving the ears of corn, a rotary silking-brush arranged transversely above said rollers and provided at its opposite ends with journals, swinging bearing-arms at the opposite ends of the brush, and bearings for said journals swiveled on said swinging arms, substantially as set forth.

11. The combination of substantially horizontal rotary rollers for supporting and revolving the ears of corn, a rotary silking-brush arranged transversely above said rollers and provided at its opposite ends with journals, swinging bearing-arms at the opposite ends of the brush, bearings for said journals swiveled on said swinging arms, counterbalancing-weights connected to said swinging arms, and stops for limiting the movement of the brush, substantially as set forth.

12. The combination of substantially horizontal rotary rollers for supporting and revolving the ears of corn, a rotary silking-brush arranged transversely above said rollers and provided at its opposite ends with journals, swinging bearing-arms at the opposite ends of the brush, bearings for said journals swiveled on said swinging arms, and driving connections for said brushes movable with said swinging arms, substantially as set forth.

13. The combination of substantially horizontal rollers for supporting and revolving the ears of corn, a rotary silking-brush arranged transversely above said rollers and provided at its ends with journals, swinging arms at the opposite ends of said brush provided with bearings for said journals, a support for one of said swinging arms, a shaft on which the other swinging arm is pivoted, means for driving said shaft, and connections between said shaft and the adjacent journal of the brush for rotating the latter, substantially as set forth.

14. The combination of means supporting and turning the ears of corn, a rotary silking-brush arranged above said support, and a trough for receiving the silk from the brush and arranged with one side in proximity to the periphery of the brush, substantially as set forth.

15. The combination of means for supporting and turning the ears of corn, a rotary silking-brush arranged above said support, and a trough for receiving the silk from the brush and arranged above the brush and provided with a curved side in proximity to the periphery of the brush, substantially as set forth.

16. The combination of means for supporting the ears of corn, a rotary silking-brush arranged above said support, movable bearings for said brush, and a trough for receiving the silk from the brush and which is movable with said brush and bearings, substantially as set forth.

Witness my hand this 19th day of January, 1903.

JOHN C. McINTYRE.

Witnesses:
M. J. HAWKINS,
P. D. HART.